United States Patent
Dimascio et al.

(10) Patent No.: US 10,831,564 B2
(45) Date of Patent: Nov. 10, 2020

(54) BOOTSTRAPPING A CONVERSATION SERVICE USING DOCUMENTATION OF A REST API

(71) Applicant: INTERNATIONAL BUSINESS MACHINES CORPORATION, Armonk, NY (US)

(72) Inventors: Carmine Dimascio, West Roxbury, MA (US); Benjamin L. Johnson, Baltimore City, MD (US); Florian Pinel, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 15/843,126

(22) Filed: Dec. 15, 2017

(65) Prior Publication Data

US 2019/0188056 A1    Jun. 20, 2019

(51) Int. Cl.

| | |
|---|---|
| *G06F 9/54* | (2006.01) |
| *G10L 15/22* | (2006.01) |
| *G10L 15/06* | (2013.01) |
| *G10L 15/18* | (2013.01) |
| *G06N 20/00* | (2019.01) |
| *G06F 17/28* | (2006.01) |
| *G06F 17/27* | (2006.01) |

(Continued)

(52) U.S. Cl.
CPC .............. *G06F 9/541* (2013.01); *G06F 40/35* (2020.01); *G06F 40/56* (2020.01); *G06N 20/00* (2019.01); *G10L 15/063* (2013.01); *G10L 15/1815* (2013.01); *G10L 15/22* (2013.01)

(58) Field of Classification Search
CPC .... G06F 9/541; G06F 17/279; G06F 17/2881; G06N 20/00; G10L 15/063; G10L 15/1815; G10L 15/22
See application file for complete search history.

(56) References Cited

U.S. PATENT DOCUMENTS

| | | |
|---|---|---|
| 6,453,465 B1 | 9/2002 | Klein |
| 7,765,097 B1 | 7/2010 | Yu et al. |
| 7,809,570 B2 | 10/2010 | Kennewick et al. |

(Continued)

OTHER PUBLICATIONS

Carmine Dimascio et al., "Automatic Seeding of an Application Programming Interface (API) Into a Conversational Interface", U.S. Appl. No. 15/843,119, filed Dec. 15, 2017.

(Continued)

*Primary Examiner* — Brian W Wathen
*Assistant Examiner* — Kimberly L Jordan
(74) *Attorney, Agent, or Firm* — Cantor Colburn LLP; Brian Welle

(57) ABSTRACT

Systems, methods, and computer-readable media for constructing a conversation model using documentation of an application programming interface (API) are disclosed. The conversation model can be used to train a natural language classifier. API endpoints may be represented in the API documentation as (verb, resource, element) tuples. These tuples can be converted into intent and parameters of the API endpoints can be converted into entities. In addition, example utterances may be created for each intent. The conversation model can be generated using the intents, example utterances, and/or entities.

20 Claims, 4 Drawing Sheets

(51) Int. Cl.
*G06F 40/35* (2020.01)
*G06F 40/56* (2020.01)

(56) References Cited

U.S. PATENT DOCUMENTS

| | | | |
|---|---|---|---|
| 8,694,305 | B1 | 4/2014 | Grove et al. |
| 9,092,276 | B2 | 7/2015 | Allen et al. |
| 9,189,749 | B2 | 11/2015 | Estes |
| 10,268,679 | B2* | 4/2019 | Li .................. G06F 17/279 |
| 2005/0234873 | A1 | 10/2005 | Milligan et al. |
| 2007/0203693 | A1 | 8/2007 | Estes |
| 2008/0071533 | A1 | 3/2008 | Cave et al. |
| 2012/0041903 | A1 | 2/2012 | Beilby et al. |
| 2012/0259891 | A1 | 10/2012 | Edoja |
| 2012/0260263 | A1 | 10/2012 | Edoja |
| 2014/0279050 | A1 | 9/2014 | Makar et al. |
| 2015/0169385 | A1* | 6/2015 | Allen .................. G06F 9/541 719/328 |
| 2015/0294595 | A1* | 10/2015 | Hu .................. G06Q 10/101 434/127 |
| 2017/0060540 | A1 | 3/2017 | Allen et al. |
| 2019/0370753 | A1* | 12/2019 | Pais .................. G06Q 10/1091 |

OTHER PUBLICATIONS

List of IBM Patents or Patent Applications Treated as Related; (Appendix P), Filed Dec. 15, 2017); 2 pages.

[Online]; [Retrieved on Dec. 14, 2017], [Retrieved from Internet using: https://www.microsoft.com/en-us/research/wp-content/uploads/2016102/tr-2000-43.pdf], M. Smith, et al., "Conversation Trees and Threaded Chats," in Proceedings of the 2000 ACM conference on Computer supported cooperative work, pp. 97-105. ACM, 2000.

[Online]; [retrieved on Dec. 14, 2017]; Retrieved from Internet using: https://www.researchgate.net/profile/Paul_Tarau/publication/220968674_Conversational_Agents_as_Web_Services/links/0c960517f2f368fb49000000.pd, E. Figa et al., "Conversational Agents As Web Services," International Conference on Internet Computing, pp. 773-782. 2004.

Stanford University, [online]; https://mobisocial.stanford.edu/papers/sabrina.pdf, Giovanni Campagna et al., "Sabrina: The Architecture of an Open, Crowdsourced, Privacy-Preserving, Programmable Virtual Assistant", 2016, pp. 1-9.

University of Wisconsin-Madison, [online] retrieved from the Internet https://pdfs.semanticscholar.org/168f/f6d977c0e2267223f189cfa70555851def54.pdf. Rogers Jeffrey Leo John et al., "AVA: From Data to Insights Through Conversation," in CIDR. 2017, pp. 1-10.

Jesai et al.; "Program Synthesis Using Natural Language"; 2016 IEEE/ACM 38th International Conference on Software Engineering (ICSE); May 14-22, 2016; 1 Pages.

Ernst; "Natural Language is a Programming Language: Applying Natural Language Processing to Software Development"; SNAPL: The 2nd Summit on Advances in Programming Languages; Article No. 4; 2017; pp. 1:1-4:14.

Knöll et al.; "Pegasus—First Steps Toward a Naturalistic Programming Language"; OOPSLA '06; Oct. 22-26, 2006; pp. 542-559.

Lin et al.; "Program Synthesis from Natural Language Using Recurrent Neural Networks"; Retrieved Online from ittps://homes.cs.washington.edu/-mernst/pubs/nl-command-tr170301-abstract.html; Mar. 2017; 12 pages.

Lopes et al; "Beyond AOP: Toward Naturalistic Programming"; OOPSLA '03; Oct. 26-30, 2003; pp. 198-2017.

Mihalcea et al; "NLP (Natural Language Processing) for NLP (Natural Language Programming)"; A. Gelbukh (Ed.): CICLing; LNCS 3878; 2006; pp. 319-330.

Mou et al.; "On End-to-End Program Generation from User Intention by Deep Neural Networks"; Retrieved Online from arXiv:1510.07211v1 [cs.SE]; Oct. 25, 2015; 4 Pages.

* cited by examiner

BOOTSTRAPPING A CONVERSATION SERVICE USING DOCUMENTATION OF A REST API

BACKGROUND

An application programming interface (API) can be a set of subroutine definitions, protocols, tools, or the like for building application software. More generally, an API is a set of clearly defined methods of communication between various software components. An API can provide the building blocks for developing a computer program in the form of an API specification which may include routines, data structures, object classes, variable, remotes calls, and so forth.

Representational state transfer (REST) is a style of architecture based on a set of principles/constraints that describe how networked resources are defined and addressed. Web services APIs that adhere to the REST architectural constraints may be referred to as RESTful APIs or simply REST APIs. Existing REST APIs suffer from various drawbacks, technical solutions to at least some of which are described herein.

SUMMARY

In one or more example embodiments, a method for constructing a conversation model using documentation of an application programming interface (API) is disclosed. The method includes generating a respective intent for each API endpoint in a set of API endpoints identified in the documentation of the API and generating a respective set of utterance examples for each respective intent. The method further includes generating the conversation model using each respective intent and each respective set of utterance examples. The conversation model can then be used to train a natural language classifier.

In one or more other example embodiments, a system for constructing a conversation model using documentation of an application programming interface (API) is disclosed. The system includes at least one memory storing computer-executable instructions and at least one processor configured to access the at least one memory and execute the computer-executable instructions to perform a set of operations. The operations include generating a respective intent for each API endpoint in a set of API endpoints identified in the documentation of the API and generating a respective set of utterance examples for each respective intent. The operations further include generating the conversation model using each respective intent and each respective set of utterance examples. The conversation model can then be used to train a natural language classifier.

In one or more other example embodiments, a computer program product for constructing a conversation model using documentation of an application programming interface (API) is disclosed. The computer program product includes a non-transitory storage medium readable by a processing circuit, the storage medium storing instructions executable by the processing circuit to cause a method to be performed. The method includes generating a respective intent for each API endpoint in a set of API endpoints identified in the documentation of the API and generating a respective set of utterance examples for each respective intent. The method further includes generating the conversation model using each respective intent and each respective set of utterance examples. The conversation model can then be used to train a natural language classifier.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
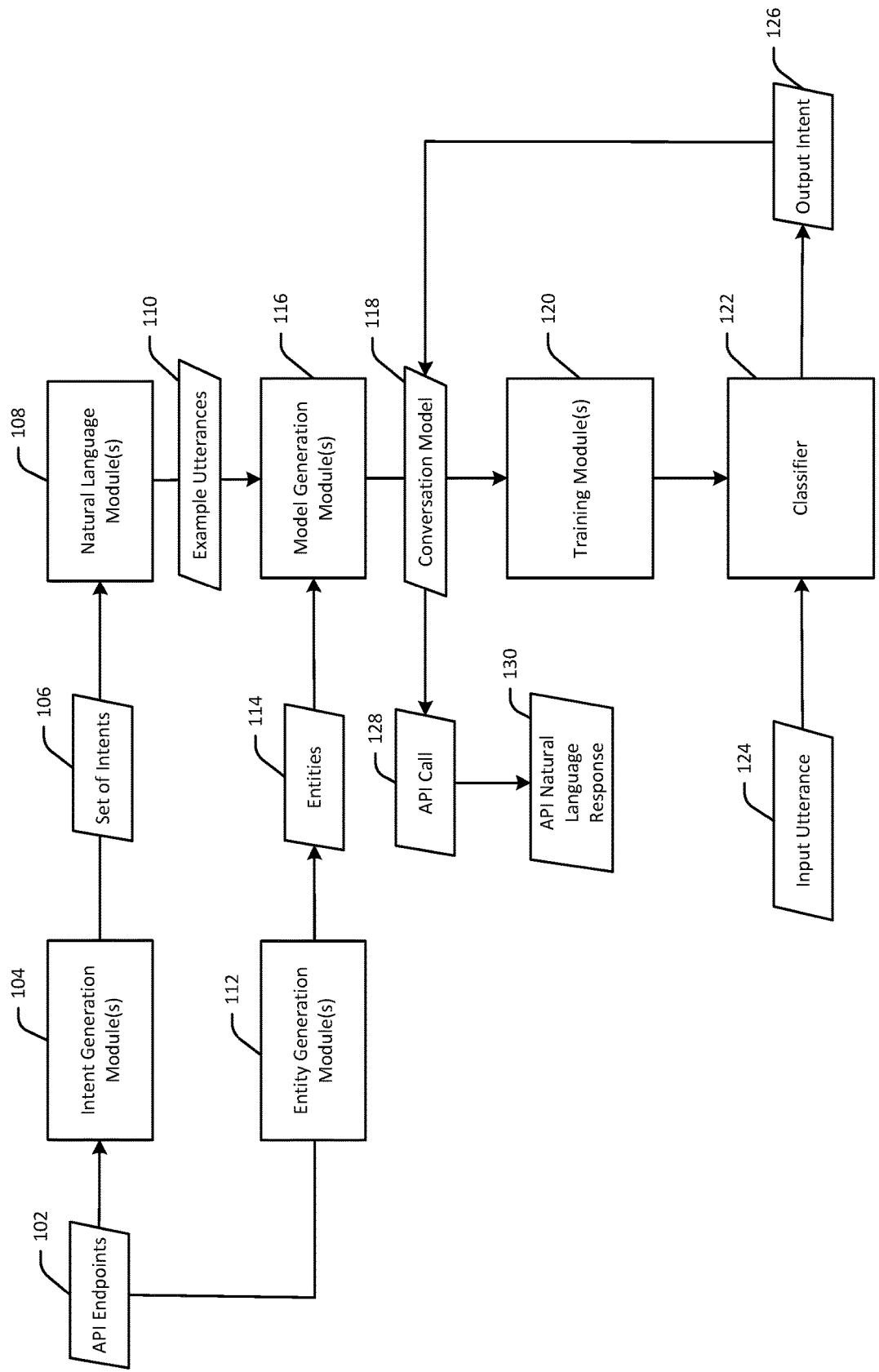
FIG. 1 is a schematic hybrid data flow/block diagram illustrating construction of a conversation model using API documentation and training of a natural language classifier using the conversation model in accordance with one or more example embodiments.

Example embodiments include, among other things, systems, methods, computer-readable media, techniques, and methodologies for constructing a conversation model using documentation associated with an API and then using the conversation model to train a natural language classifier. In certain example embodiments, the API may be a REST API. A REST API may include one or more resources that can be manipulated using verbs (e.g., hypertext transfer protocol (HTTP) methods). Optionally, an API may also operate on a specific element of a given resource. Generally, an API endpoint may be represented by a (verb, resource, optional element) tuple. For instance, an example API may include the following API endpoint: GET https://api.weather.com/v1/location/30075:4:US/forecast/daily/3day.json, which may return the 3-day forecast for US zip code 30075. In this example, "forecast/daily/3day" may be the resource, "30075:4:US" may be the specific element, and GET may be the verb. In addition, each API endpoint may have additional input parameters as well as an output that is returned in response to a call to the API endpoint.

Example embodiments utilize documentation of an existing API (e.g., a REST API) to bootstrap a conversation tree that serves as a model of a conversation service. Most APIs include some documentation that describes their endpoints, input parameters, and outputs. Some API documentation formats may be machine-readable, while others may require some preliminary parsing to extract API endpoint information. In certain example embodiments, actions (e.g., verbs) and optionally resources and/or elements associated with API endpoints may be identified from the documentation and converted into intents. In addition, parameters associated with API endpoints may be converted into entities. Further, utterance examples may be determined for each intent using, for example, a (verb, resource, element) tuple of the endpoint. In example embodiments, an utterance example may include an action and an object. As a non-limiting example, an utterance example for the intent "GET" where the utterance example object is a resource name may be "what is the 3-day daily forecast?"

A conversation model may then be generated using the intents and the corresponding entities. More specifically, a conversation tree may be generated that includes a respective top-level node for each intent. In example embodiments, each intent may correspond to a particular API endpoint. The API documentation may be analyzed to determine which input field(s) (if any) are mandatory for each API endpoint. Sub-nodes may then be added to the conversation tree to represent mandatory input fields for API endpoints that correspond to intents represented by top-level nodes in the conversation tree. The presence of sub-nodes in the conversation tree may prompt the conversation service based thereon to prompt a user for missing mandatory input fields. In addition, terminal nodes may be created for storing the API endpoints and/or input fields in the conversation response payload.

In example embodiments, the conversation model may be used to train a natural language classifier. More specifically, the utterance examples generated with respect to each intent may serve as positive training examples in training the natural language classifier. Once trained, the natural language classifier can be used to classify an input utterance as corresponding to a particular conversation service or intent, and thus, a particular API or API endpoint. A call may then be made to the API endpoint to initiate a corresponding action, and a natural language API response may be generated in response to the call to the API endpoint.

Various illustrative methods of the disclosure and corresponding data structures associated therewith will now be described. It should be noted that each operation of the methods 200 or 300 may be performed by one or more of the program modules or the like depicted in FIG. 1 or 4, whose operation will be described in more detail hereinafter. These program modules that may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
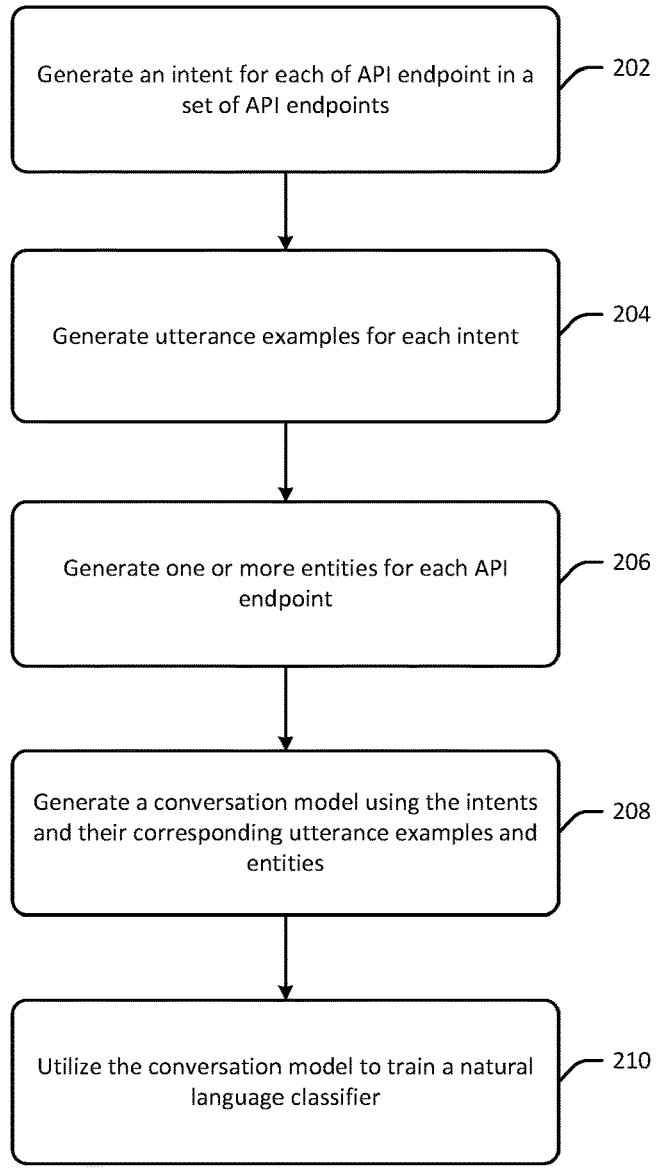
FIG. 2 is a process flow diagram of an illustrative method for constructing a conversation model using API documentation and training a natural language classifier using the conversation model in accordance with one or more example embodiments.
Figure 3:
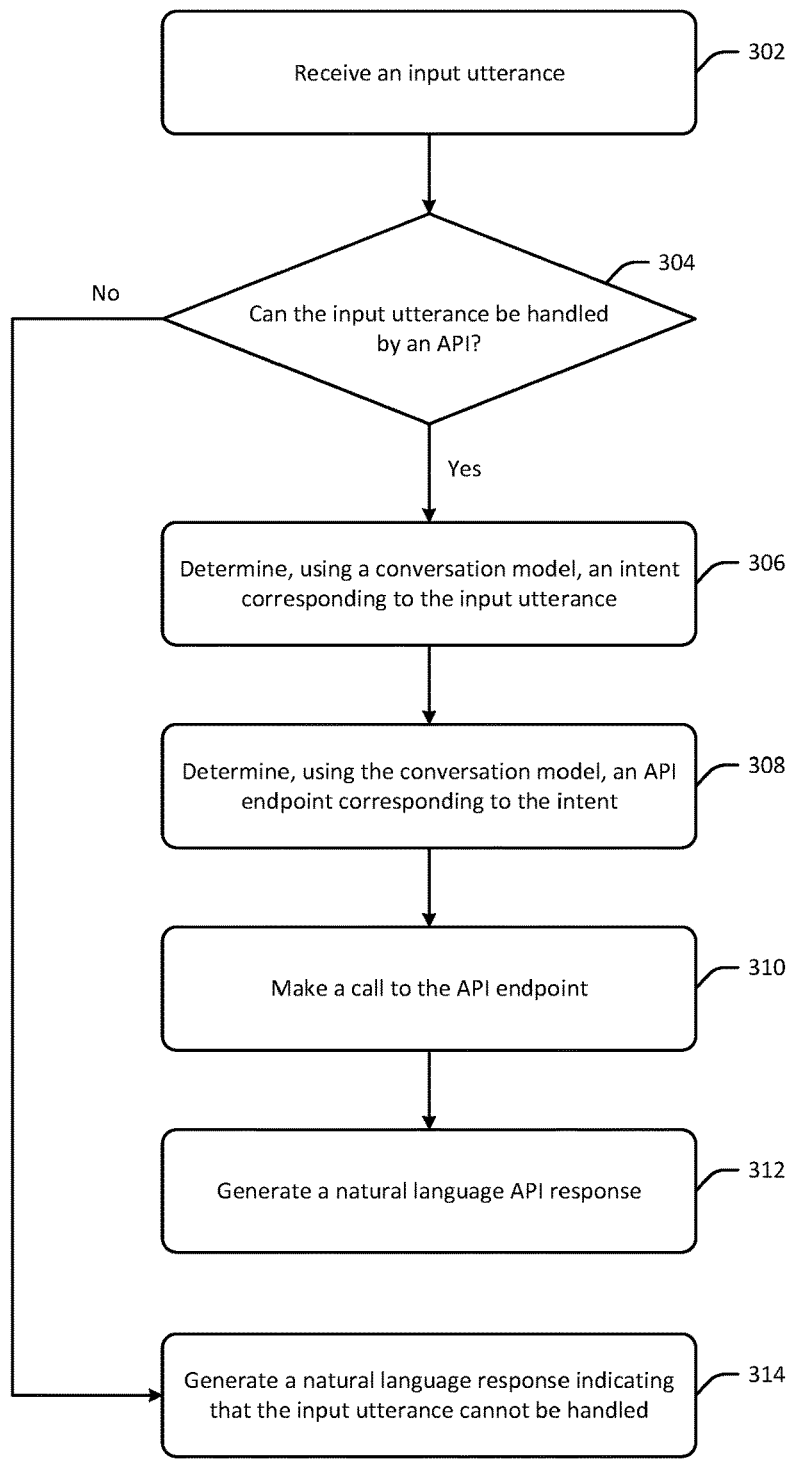
FIG. 3 is a process flow diagram of an illustrative method for utilizing a trained natural language classifier and a conversation model to correlate an input utterance with an API endpoint in accordance with one or more example embodiments.

FIG. 1 is a schematic hybrid data flow/block diagram illustrating construction of a conversation model using API documentation and training of a natural language classifier using the conversation model. FIG. 2 is a process flow diagram of an illustrative method 200 for constructing a conversation model using API documentation and training a natural language classifier using the conversation model. FIG. 3 is a process flow diagram of an illustrative method 300 for utilizing a trained natural language classifier and a conversation model to correlate an input utterance with an API endpoint. Each of FIGS. 2 and 3 will be described in conjunction with FIG. 1 hereinafter.

Referring first to FIG. 2 in conjunction with FIG. 1, at block 202 of the method 200, computer-executable instructions of one or more intent generation modules 104 may be executed to generate an intent 106 for each API endpoint in a set of API endpoints 102. More specifically, computer-executable instructions of the intent generation module(s) 104 may be executed to analyze API documentation to generate intents 106 from the API endpoints 102. As previously described, each API endpoint 102 may be represented, for example, as a (verb, resource, element) tuple, in which case, the verb and resource may correspond to an intent. An intent may refer to a desired goal, purpose, or action associated with user input to a conversation service.

At block 204 of the method 200, computer-executable instructions of one or more natural language modules 108 may be executed to generate a collection of example utterances 110 for each intent 106. In example embodiments, an utterance example 110 may be generated using a (verb, resource, element) tuple of the API endpoint. In particular, an example utterance 110 may include an action and an object. For instance, for a GET intent without an element, corresponding example utterances may include "what are . . . ," "give me all the . . . ," or the like. As another non-limiting example, for a GET intent with an element, corresponding example utterances may include "what is . . . ," "tell me . . . ," or the like. As additional non-limiting examples, an example utterance for a DELETE intent may begin with the term "delete" and an example utterance for a POST intent may begin with the term "add." It should be appreciated that the above examples of intents and corresponding example utterances are merely illustrative and not exhaustive.

In example embodiments, the object portion of an example utterance 110 may be an API endpoint resource name or a synonym identified from the API documentation or another source. As another non-limiting example, the object may be a resource name as well as a field in the API response output message. As still another non-limiting example, the object may be a resource name, a field in the output message, and a field value located in the API documentation. In certain example embodiments, a field value located in the API documentation may require changing the action portion of the utterance example.

As a non-limiting example, an example endpoint may be as follows: GET https://api.weather.com/v1/location/30075:4:US/forecast/daily/3day.json. In this example, the corresponding intent that is generated may be a GET intent to retrieve a 3-day daily forecast. A corresponding example utterance in which the object portion is a resource name may be "what is the 3-day daily forecast?" A corresponding example utterance in which the object portion is a synonym for the resource name may be "what is the weather like over the next 3 days?" As another non-limiting example, an example utterance in which the object portion is a resource name as well as a field in the output message may be "what is the 3-day daily forecast temperature" or "what is the 3-day daily forecast precipitation" or "what is the 3-day daily wind speed" or the like. As yet another non-limiting example, if a zip code, for example, is an input field value associated with the API endpoint, an example utterance having an object portion that includes a resource name, an output message field, and an input field value (e.g., zip code) may be "what is the 3-day daily forecast in 30075?" It should be appreciated that the above examples of utterances that may be generated for a given intent/API endpoint are merely illustrative and not exhaustive.

In certain example embodiments, multiple intents may be generated for a given API endpoint. For instance, a respective intent may be generated for each of multiple output fields. Referring to the example API endpoint introduced earlier, separate intents may be created for the temperature and precipitations fields. In certain example embodiments, users may be provided with the capability to select which output fields should become separate intents.

At block 206 of the method 200, computer-executable instructions of one or more entity generation modules 112 may be executed to generate a respective one or more entities 114 for each API endpoint 102. In example embodiments, for each API endpoint, an entity may be created for the endpoint element (if present) and for each input field. More generally, an entity may be created for each parameter of the API endpoint. In certain example embodiments, type and possible values for the entities may be inferred from the API documentation. For example, entities of certain types may be mapped to system entities (e.g., time entities), which may allow for the recognition of formats that are specific to natural language (e.g., "today" can be converted to a date format). In certain example embodiments, users may be provided with the capability to select which input should be converted into entities.

At block 208 of the method 200, computer-executable instructions of one or more model generation modules 116 may be executed to construct a conversation model 118 based at least in part on the intents 106 and their corresponding example utterances 110 and entities 114. In an example implementation, constructing the conversation model 118 may include generating a conversation tree that includes a respective top-level node for each intent. As previously described, each intent may correspond to a particular API endpoint. At block 208, as part of the constructing the conversation model 118, the model generation module(s) 116 may analyze the API documentation to determine which input field(s) (if any) are mandatory for each API endpoint and may generate sub-nodes to the top-level nodes to represent mandatory input fields for API endpoints that correspond to intents represented by the top-level nodes. The presence of sub-nodes in the conversation tree may prompt the conversation service based thereon to prompt a user for missing mandatory input fields. In addition, the model generation module(s) 116 may create terminal nodes for storing the API endpoints and/or input fields in the conversation response payload. In certain example embodiments, intents and corresponding nodes in the conversation model 118 (e.g., conversation tree) may be generated to permit users to query a corresponding conversation service as to what API resources exist and what actions can be performed on them.

At block 210 of the method 200, the conversation model 118 may be used to train a natural language classifier 122. More specifically, computer-executable instructions of one or more training modules 120 may be executed to utilize the conversation model 118 to train the classifier 122. For instance, the utterance examples 110 generated with respect to each intent may serve as positive training examples in training the natural language classifier 122. In certain example embodiments, utterance examples in conversation models constructed for other APIs may be used as negative training examples. In other example embodiments, the classifier 122 may be trained without the use of negative training examples. For instance, an ML classification algorithm that does not require negative training examples may be used.

Once trained, the natural language classifier can be used to determine whether an input utterance can be handled by an API, and if so, classify the input utterance as corresponding to a particular API or a particular API endpoint. In particular, referring now to FIG. 3, at block 302 of the method 300, an input utterance 124 may be received by the trained classifier 122. Then, at block 304 of the method 300, the trained natural language classifier 122 may determine whether the input utterance 124 can be handled by an API. In response to a negative determination at block 304, the method 300 may proceed to block 314, where a natural language response indicating that the input utterance 124 cannot be handled may be provided to a user. For instance, the trained classifier 122 may determine that the example input utterance "what time is it?" cannot be handled by a weather API, in which case, a response may be provided to the user indicating that the query cannot be handled. On the other hand, in response to a positive determination at block 304, the method 300 may proceed to block 306, where an output intent 126 corresponding to the input utterance 124 may be determined using the conversation model 118. As previously described, the conversation model 118 may be constructed by the example method 200 of FIG. 2.

At block 308 of the method 300, an API endpoint 102 corresponding to the output intent 126 may be determined using the conversation model 118. Then, at block 310 of the method 300, a call 128 may be made to the API endpoint 102 determined to correspond to the output intent 126. At block 312 of the method 300, a natural language API response 130 may be generated. In particular, the API call 128 made at block 310 may initiate a corresponding action represented by the output intent 126, and the natural language API response 130 may be generated in response to the call to the API endpoint. Certain APIs provide a natural language phrase as part of the API responses. In other example embodiments, API response fields may be converted into simple natural language phrases. In addition, users may be provided with the capability to specify messages with placeholders for the response fields.

In certain example embodiments, trained classifiers and conversation models constructed for multiple APIs may be combined to generate a more generic conversation service (e.g., a chatbot) that can assist users with a variety of tasks. Further, the trained classifier, the conversation model, and the API response generation may constitute a flow snippet that can be inserted into a larger flow and executed as part of a flow execution engine. In addition, while example embodiments may be described herein in connection with REST APIs, it should be appreciated that embodiments are not limited to REST APIs or public APIs, but rather are applicable to any programming API such as, for example, any web service or any internet-of-things (IoT) sensor (provided that the sensor has documented inputs or outputs).

Example embodiments of the disclosure provide various technical features, technical effects, and/or improvements to computer technology that solve various technical problems associated with APIs such as REST APIs. In particular, existing APIs suffer from the technical problem of having to rely on a manual identification of sample utterances to bootstrap a natural language conversational interface using API documentation. This is a time-consuming and error-prone process that may ultimately be unreliable.

Example embodiments of the disclosure provide the technical effect and technical features of automatically generating a conversation model from API documentation and training a natural language classifier such that the trained classifier and conversation model can accurately identify the APIs and intents corresponding to input utterances received from a user, while avoiding the need to manually identify sample utterances for training the conversation model and the classifier, and thereby obviating the technical problem identified above associated with conventional mechanisms. Example embodiments also yield a number of additional technical benefits. For instance, conversation models constructed and classifiers associated with multiple different APIs may be integrated to yield a comprehensive conversation service that enables user interaction with multiple APIs and the performance of a varied set of tasks.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
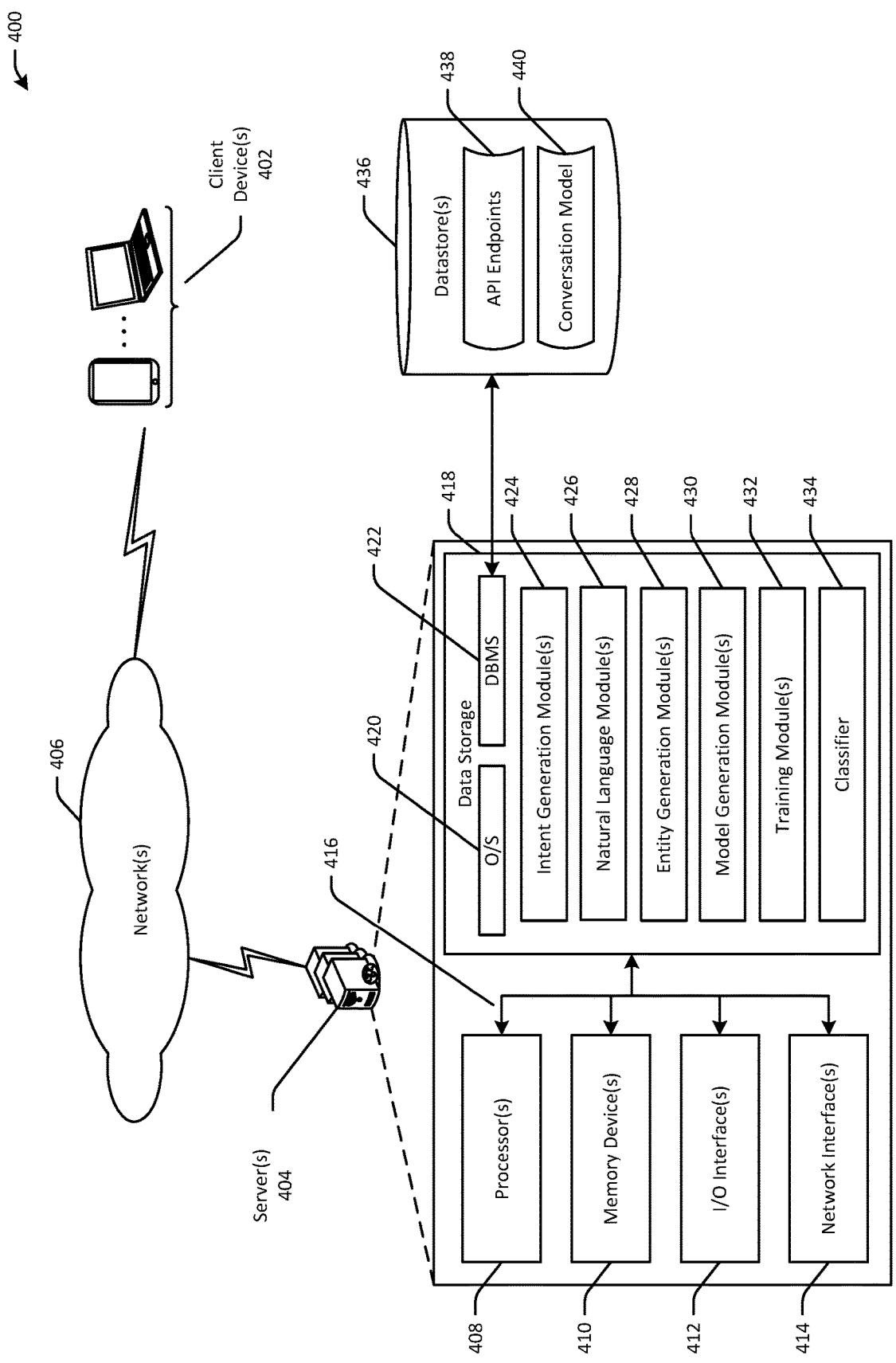
FIG. 4 is a schematic diagram of an illustrative networked architecture configured to implement one or more example embodiments.

FIG. 4 is a schematic diagram of an illustrative networked architecture 400 configured to implement one or more example embodiments of the disclosure. For example, in the illustrative implementation depicted in FIG. 4, the networked architecture 400 includes one or more user devices 402 and one or more servers 404. The user device(s) 402 may include any suitable user device such as, for example, a personal computer (PC), a tablet, a smartphone, a wearable device, a voice-enabled device, or the like. In certain example embodiments, the user device(s) 402 may provide a natural language conversational interface (e.g., a voice-based interface, a text-based interface, etc.) via which a user can initiate API calls. While any particular component of the networked architecture 400 may be described herein in the singular (e.g., a server 404), it should be appreciated that multiple instances of any such component may be provided, and functionality described in connection with a particular component may be distributed across multiple ones of such a component.

The server(s) 404 and the user device(s) 402 may be configured to communicate via one or more networks 406. The network(s) 406 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 406 may have any suitable communication range associated therewith and may include, for example, global networks (e.g., the Internet), metropolitan area networks (MANs), wide area networks (WANs), local area networks (LANs), or personal area networks (PANs). In addition, the network(s) 406 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 404 may include one or more processors (processor(s)) 408, one or more memory devices 410 (generically referred to herein as memory 410), one or more input/output ("I/O") interface(s) 412, one or more network interfaces 414, and data storage 418. The server 404 may further include one or more buses 416 that functionally couple various components of the server 404.

The bus(es) 416 may include at least one of a system bus, a memory bus, an address bus, or a message bus, and may permit the exchange of information (e.g., data (including computer-executable code), signaling, etc.) between various components of the server 404. The bus(es) 416 may include, without limitation, a memory bus or a memory controller, a peripheral bus, an accelerated graphics port, and so forth. The bus(es) 416 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 410 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 410 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 410 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 418 may include removable storage and/or non-removable storage including, but not limited to, magnetic storage, optical disk storage, and/or tape storage. The data storage 418 may provide non-volatile storage of computer-executable instructions and other data. The memory 410 and the data storage 418, removable and/or non-removable, are examples of computer-readable storage media (CRSM) as that term is used herein.

The data storage 418 may store computer-executable code, instructions, or the like that may be loadable into the memory 410 and executable by the processor(s) 408 to cause the processor(s) 408 to perform or initiate various operations. The data storage 418 may additionally store data that may be copied to memory 410 for use by the processor(s) 408 during the execution of the computer-executable instructions. Moreover, output data generated as a result of execution of the computer-executable instructions by the processor(s) 408 may be stored initially in memory 410 and may ultimately be copied to data storage 418 for non-volatile storage.

More specifically, the data storage 418 may store one or more operating systems (O/S) 420; one or more database management systems (DBMS) 422 configured to access the memory 410 and/or one or more external datastores 432; and one or more program modules, applications, engines, managers, computer-executable code, scripts, or the like such as, for example, intent generation module(s) 424, natural language module(s) 426, entity generation module(s) 428, model generation module(s) 430, training module(s) 432, and a classifier 434. Any of the components depicted as being stored in data storage 418 may include any combination of software, firmware, and/or hardware. The software and/or firmware may include computer-executable instructions (e.g., computer-executable program code) that may be loaded into the memory 410 for execution by one or more of the processor(s) 408 to perform any of the operations described earlier in connection with correspondingly named modules.

Although not depicted in FIG. 4, the data storage 418 may further store various types of data utilized by components of the server 404 (e.g., any of the data depicted as being stored in one or more external datastore(s) 436). Any data stored in the data storage 418 may be loaded into the memory 410 for use by the processor(s) 408 in executing computer-executable instructions. In addition, any data stored in the data storage 418 may potentially be stored in the external datastore(s) 436 and may be accessed via the DBMS 422 and loaded in the memory 410 for use by the processor(s) 408 in executing computer-executable instructions.

The processor(s) 408 may be configured to access the memory 410 and execute computer-executable instructions loaded therein. For example, the processor(s) 408 may be configured to execute computer-executable instructions of the various program modules, applications, engines, managers, or the like of the server 404 to cause or facilitate various operations to be performed in accordance with one or more embodiments of the disclosure. The processor(s) 408 may include any suitable processing unit capable of accepting data as input, processing the input data in accordance with stored computer-executable instructions, and generating output data. The processor(s) 408 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 408 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 408 may be capable of supporting any of a variety of instruction sets.

Referring now to other illustrative components depicted as being stored in the data storage 418, the O/S 420 may be loaded from the data storage 418 into the memory 410 and may provide an interface between other application software executing on the server 404 and hardware resources of the server 404. More specifically, the O/S 420 may include a set of computer-executable instructions for managing hardware resources of the server 404 and for providing common services to other application programs. In certain example embodiments, the O/S 420 may include or otherwise control execution of one or more of the program modules, engines, managers, or the like depicted as being stored in the data storage 418. The O/S 420 may include any operating system now known or which may be developed in the future including, but not limited to, any server operating system, any mainframe operating system, or any other proprietary or non-proprietary operating system.

The DBMS 422 may be loaded into the memory 410 and may support functionality for accessing, retrieving, storing, and/or manipulating data stored in the memory 410, data stored in the data storage 418, and/or data stored in external datastore(s) 436. The DBMS 422 may use any of a variety of database models (e.g., relational model, object model, etc.) and may support any of a variety of query languages. The DBMS 422 may access data represented in one or more data schemas and stored in any suitable data repository. Data stored in the datastore(s) 436 may include, for example, API endpoint documentation data 438, data 440 indicative of a conversation model that is constructed, or the like. External datastore(s) 436 that may be accessible by the server 404 via the DBMS 422 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the server 404, the input/output (I/O) interface(s) 412 may facilitate the receipt of input information by the server 404 from one or more I/O devices as well as the output of information from the server 404 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 404 or may be separate. The I/O devices may further include, for example, any number of peripheral devices such as data storage devices, printing devices, and so forth.

The I/O interface(s) 412 may also include an interface for an external peripheral device connection such as universal serial bus (USB), FireWire, Thunderbolt, Ethernet port or other connection protocol that may connect to one or more networks. The I/O interface(s) 412 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 404 may further include one or more network interfaces 414 via which the server 404 may communicate with any of a variety of other systems, platforms, networks, devices, and so forth. The network interface(s) 414 may enable communication, for example, with one or more other devices via one or more of the network(s) 406.

It should be appreciated that the program modules/engines depicted in FIG. 4 as being stored in the data storage 418 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the server 404 and/or other computing devices accessible via the network(s) 406, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the server 404 may include alternate and/or additional hardware, software, or firmware components beyond those described or depicted without departing from the scope of the disclosure. More particularly, it should be appreciated that software, firmware, or hardware components depicted as forming part of the server 404 are merely illustrative and that some components may not be present or additional components may be provided in various embodiments. While various illustrative modules have been depicted and described as software modules stored in data storage 418, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the methods 200 or 300 may be performed by a server 404 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative methods of FIGS. 2 and 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2 and 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for constructing a conversation model using documentation of an application programming interface (API), the method comprising:
    generating a respective intent for each API endpoint in a set of API endpoints identified in the documentation of the API;
    generating a respective set of utterance examples for each respective intent; and
    generating the conversation model using each respective intent and each respective set of utterance examples; and
    utilizing the conversation model to train a natural language classifier, the natural language classifier being used to classify an input utterance as corresponding to a particular API endpoint, wherein utilizing the conversation model to train the natural language classifier further comprises using positive training examples and negative training examples to train the natural language classifier.

2. The computer-implemented method of claim 1, further comprising:
    receiving the input utterance;
    determining, using the trained natural language classifier, that the input utterance can be handled by the API;
    determining, using the conversation model, a particular intent corresponding to the input utterance;
    determining, using the conversation model, the particular API endpoint corresponding to the particular intent;
    making a call to the particular API endpoint; and
    generating a natural language API response to the input utterance.

3. The computer-implemented method of claim 2, wherein utilizing the conversation model to train the natural language classifier comprises utilizing each respective set of utterance examples as the positive training examples.

4. The computer-implemented method of claim 1, wherein generating the respective intent for each API endpoint comprises converting a respective resource of each API endpoint into the respective intent.

5. The computer-implemented method of claim 1, further comprising generating a respective set of one or more entities for each API endpoint, wherein the conversation model is generated further based at least in part on each respective set of one or more entities.

6. The computer-implemented method of claim 5, wherein generating a respective set of one or more entities for each API endpoint comprises converting a respective one or more parameters of each API endpoint into the respective set of one or more entities.

7. The computer-implemented method of claim 1, wherein generating the conversation model comprises:
    generating a top-level node in a conversation tree of the conversation model for each respective intent;

generating a respective set of one or more sub-nodes for each top-level node, wherein each sub-node corresponds to a mandatory input field; and generating a respective terminal node corresponding to each top-level node and each respective set of one or more sub-nodes, wherein each respective terminal node stores a respective API endpoint to which the respective intent corresponds.

8. A system for constructing a conversation model using documentation of an application programming interface (API), the system comprising:

at least one memory storing computer-executable instructions; and at least one processor configured to access the at least one memory and execute the computer-executable instructions to:

generate a respective intent for each API endpoint in a set of API endpoints identified in the documentation of the API;

generate a respective set of utterance examples for each respective intent;

generate the conversation model using each respective intent and each respective set of utterance examples; and utilize the conversation model to train a natural language classifier, the natural language classifier being used to classify an input utterance as corresponding to a particular API endpoint, wherein utilizing the conversation model to train the natural language classifier further comprises using positive training examples and negative training examples to train the natural language classifier.

9. The system of claim 8, wherein the at least one processor is further configured to execute the computer-executable instructions to:

receiving the input utterance;

determine, using the trained natural language classifier, that the input utterance can be handled by the API;

determine, using the conversation model, a particular intent corresponding to the input utterance;

determine, using the conversation model, the particular API endpoint corresponding to the particular intent;

make a call to the particular API endpoint; and generate a natural language API response to the input utterance.

10. The system of claim 9, wherein the at least one processor is further configured to utilize the conversation model to train the natural language classifier by executing the computer-executable instructions to utilize each respective set of utterance examples as the positive training examples.

11. The system of claim 8, wherein the at least one processor is configured to generate the respective intent for each API endpoint by executing the computer-executable instructions to convert a respective resource of each API endpoint into the respective intent.

12. The system of claim 8, wherein the at least one processor is further configured to execute the computer-executable instructions to generate a respective set of one or more entities for each API endpoint, and wherein the conversation model is generated further based at least in part on each respective set of one or more entities.

13. The system of claim 12, wherein the at least one processor is configured to generate a respective set of one or more entities for each API endpoint by executing the computer-executable instructions to convert a respective one or more parameters of each API endpoint into the respective set of one or more entities.

14. The system of claim 8, wherein the at least one processor is configured to generate the conversation model by executing the computer-executable instructions to:

generate a top-level node in a conversation tree of the conversation model for each respective intent;

generate a respective set of one or more sub-nodes for each top-level node, wherein each sub-node corresponds to a mandatory input field; and generate a respective terminal node corresponding to each top-level node and each respective set of one or more sub-nodes, wherein each respective terminal node stores a respective API endpoint to which the respective intent corresponds.

15. A computer program product for constructing a conversation model using documentation of an application programming interface (API), the computer program product comprising a storage medium readable by a processing circuit, the storage medium storing instructions executable by the processing circuit to cause a method to be performed, the method comprising:

generating a respective intent for each API endpoint in a set of API endpoints identified in the documentation of the API;

generating a respective set of utterance examples for each respective intent;

generating the conversation model using each respective intent and each respective set of utterance examples; and utilizing the conversation model to train a natural language classifier, the natural language classifier being used to classify an input utterance as corresponding to a particular API endpoint, wherein utilizing the conversation model to train the natural language classifier further comprises using positive training examples and negative training examples to train the natural language classifier.

16. The computer program product of claim 15, the method further comprising:

receiving the input utterance;

determining, using the trained natural language classifier, that the input utterance can be handled by the API;

determining, using the conversation model, a particular intent corresponding to the input utterance;

determining, using the conversation model, the particular API endpoint corresponding to the particular intent;

making a call to the particular API endpoint; and generating a natural language API response to the input utterance.

17. The computer program product of claim 16, wherein utilizing the conversation model to train the natural language classifier comprises utilizing each respective set of utterance examples as the positive training examples.

18. The computer program product of claim 15, wherein generating the respective intent for each API endpoint comprises converting a respective resource of each API endpoint into the respective intent.

19. The computer program product of claim 15, the method further comprising generating a respective set of one or more entities for each API endpoint, wherein the conversation model is generated further based at least in part on each respective set of one or more entities.

20. The computer program product of claim 15, wherein generating the conversation model comprises:

generating a top-level node in a conversation tree of the conversation model for each respective intent;

generating a respective set of one or more sub-nodes for each top-level node, wherein each sub-node corresponds to a mandatory input field; and generating a respective terminal node corresponding to each top-level node and each respective set of one or more sub-nodes, wherein each respective terminal node stores a respective API endpoint to which the respective intent corresponds.

* * * * *